Feb. 7, 1939. G. E. BLENDERMAN 2,146,167
FENDER GUARD
Filed Nov. 5, 1937
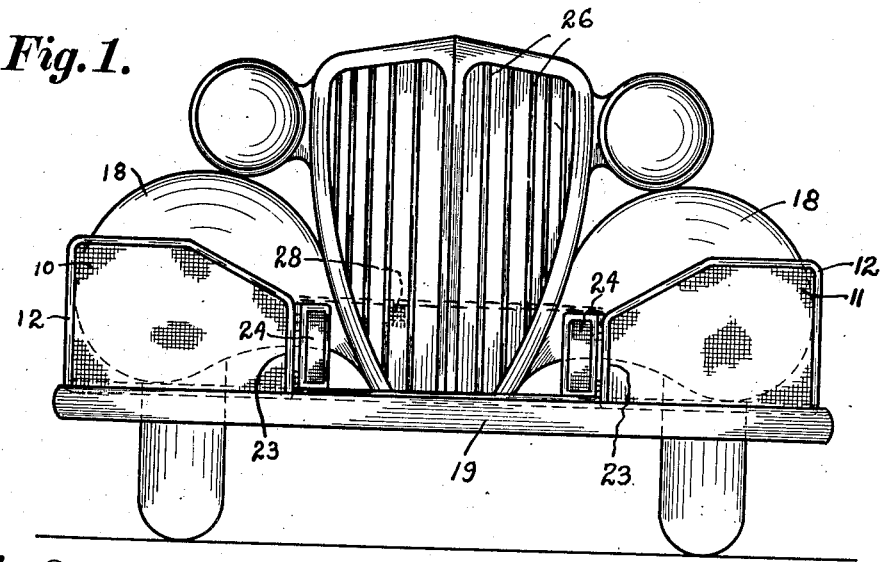
Fig.1.
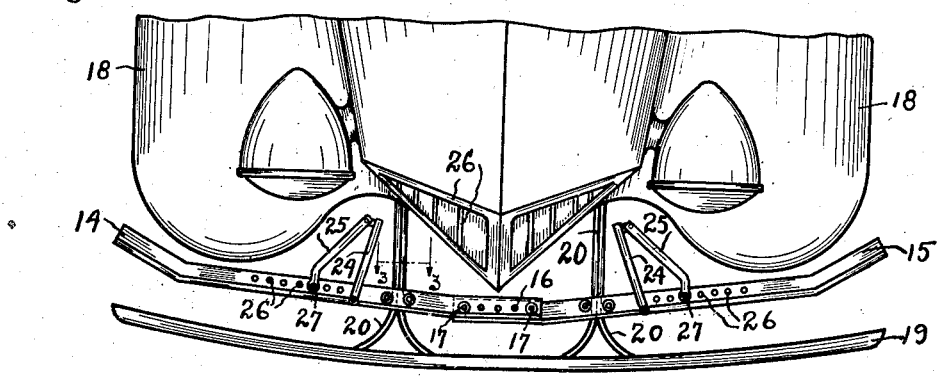
Fig.2.
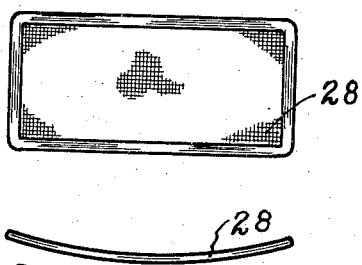
Fig.5.
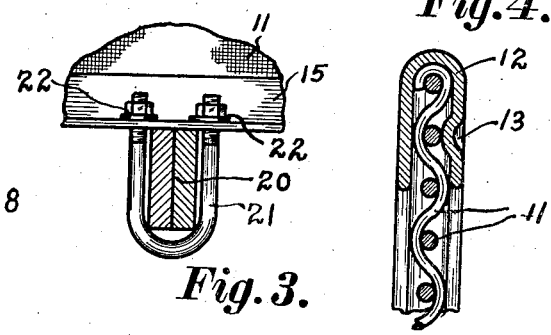
Fig.3.
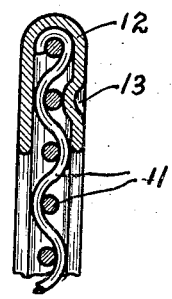
Fig.4.
Fig.6.
Inventor
By G. E. Blenderman
Arthur H. Sturges
Attorney Patented Feb. 7, 1939

2,146,167

UNITED STATES PATENT OFFICE 2,146,167

FENDER GUARD

Gordon E. Blenderman, Sioux City, Iowa

Application November 5, 1937, Serial No. 172,951

3 Claims. (Cl. 293—54)

My invention relates to the general class of automobile accessories and particularly to guards for the protection of the head lamp lenses, and the paint and finish of the bodies of automobiles.

It is the object of my invention to provide an efficient and inexpensive guard made primarily of foraminous material and having means enabling it to be readily attached and adjusted to all types and sizes of automobile bumpers and the arms thereof.

The problem to which my invention offers an effective and satisfactory solution relates especially to the fact that there has been a marked tendency in recent times toward driving automobiles at high speeds upon the highways including graveled roadways. The fast driving of vehicles upon graveled highways is entirely practicable. However, the tires of the rapidly moving vehicle compress the gravel upon the roadway and during revoluble movements of the wheels said gravel is cast rearwardly and forcefully and often sufficiently to break the lenses of a second automobile following behind the first automobile, and at times when one automobile is steered around a preceding automobile upon a graveled highway, the preceding automobile casts gravel upon the approaching vehicle with an impetus sufficient to mar the paint and varnish of the forward portions of the passing automobile, especially when said passing is repeated as is necessary during the use of a vehicle for an extended period. To facilitate the control of the undesirable prior practices the guard used for protection of the approaching vehicle need be of relatively light weight and the area thereof need not be extensive since the guard is mounted vertically on the bumper of the approaching vehicle and disposed substantially at a right angle with respect to gravel and stones cast rearwardly by the preceding vehicle while having, of course, sufficient strength to resist crushing or deformation. For convenience of handling during transportation and prior to application upon a motor vehicle, it is also desirable that the guard be of such construction that it may be folded compactly for packaging and shipment, or where shipment thereof is made to a common destination a plurality of the guards may be secured together to form a single package and be handled as a unit.

The above mentioned qualifications are all embodied in the guards constructed in accordance with my invention and illustrated in the accompanying drawing in which:

Figure 1 is a front elevation of a portion of a motor vehicle having an embodiment of my invention applied thereto.

Figure 2 is a top plan view thereof.

Figure 3 is a transverse section on line 3—3 of Figure 2.

Figure 4 is an enlarged detail of a fragment of the guard.

Figure 5 is a front elevation of an auxiliary guard part which may be employed.

Figure 6 is a top plan view of the guard shown in Figure 5.

In the preferred embodiment of my invention the guard is made primarily of heavy screen material having a mesh fine enough to prevent the passage of such gravel and debris therethrough which is of large enough size to injure the finish of a vehicle. The device includes two outwardly and oppositely disposed portions of like construction comprising the vertically disposed guards 10 and 11, the edges of the wire screens thereof, as shown in Figure 4, being inserted in frames 12. The frames 12 are U-shaped in cross section and compressed snugly upon the screens and spot welded as at 13 (Figure 4) whereby a comparatively rigid, lightweight structure is provided. The lower edges of the frames 12 are secured by any suitable means to their respective supports 14 and 15, the latter each having a plurality of selective apertures 16 at their inner ends as shown in Figure 2, whereby bolts or similar suitable keepers 17 may be inserted through the apertures for joining the guards 10 and 11 together and in accordance with the transverse width of the vehicle, said guards being mounted between the fenders 18 of the vehicle and the bumper 19, being preferably secured upon the upper edges of the bumper supporting arms 20. The supports 14 and 15 provide a preferred two piece construction for the purpose above mentioned and may consist of a single supporting bar of predetermined, selected length in instances where the device is manufactured to fit the particular transverse width of a certain make of vehicle. As best shown in Figure 3, preferably U-bolts 21 are employed which substantially encircle the bumper arms 20 and extend through the members 14 and 15, being secured by means of nuts and lock washers 22, whereby the supports 14 and 15 are rigidly secured to respective bumper supporting arms 20.

The inner vertical edges 23 of the guards are each provided with a wing 24 which is pivotally and hingedly secured to said edges as shown in Figure 1, said wings 24 being maintained in selected positions by means of the links 25, said links being pivotally attached to the inner edges of the wings and extended towards their respective supports 14 and 15.

The supports 14 and 15 are provided with further selective apertures 26 for receiving bolts 27 therethrough, the latter extending also through the links 25 whereby the wings are rigidly maintained in a selected position. The wings 24 are adjusted horizontally in accordance with the width of the radiator grill 26 of the vehicle, whereby not only the forward portions but also the sides of the fenders are protected against gravel cast by a preceding vehicle.

The modern types of vehicles are provided with grills 26 and certain of said modern types do not have their grills 26 extended downwardly to the base of the radiators, but do extend to approximately one foot from the bottom of said radiators and from the lower edge of said shorter grills and outwardly towards the bumper and terminating in alignment with the side fenders and between the latter the space is filled in with sheet metal which is finished and is of the same color as the fenders. With this latter mentioned type of vehicle the shield 28, shown in Figure 5, is employed, said shield being secured by any suitable means between the guards 10 and 11 as shown by the dotted lines thereof in Figure 1.

In a device such as illustrated the heighth of the guards 10 and 11 may be approximately 14 inches and the length between 18 and 24 inches and the device provided with a suitable finish as to color to harmonize with the vehicle to which it is applied.

From the foregoing description it is thought to be obvious that a guard for automobiles constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

I claim:—

1. A fender guard for vehicles having a bumper comprising a frame, a sheet of foraminous material within the frame, clamp means for securing said frame to a bumper arm of said vehicle forwardly of a fender, a wing guard portion pivotally attached to said frame, and a link secured to said wing and frame for maintaining said wing at a selected angle with respect to said frame and at one side of said fender for protecting the latter.

2. A guard for the front fenders of a vehicle having a bumper comprising a pair of oppositely disposed frames, portions of said frames overlapping each other and provided with selective apertures and keepers extending therethrough for locking said frames together in spaced apart relation in accordance with the width of said vehicle, clamps for securing said frames to the supporting arms of said bumper, sheets of foraminous material within each frame, a wing guard portion pivotally secured to each frame, a link secured to each wing and the supporting frame thereof for maintaining said wings at a selected angle with respect to their respective frames at the inner sides of said fenders for protecting the latter.

3. In a guard for the fenders of a motor vehicle having a bumper, a pair of oppositely disposed spaced apart frames, a sheet of foraminous material carried by each of the said frames, a bar adapted to be disposed transversely with respect to an end of said vehicle for supporting said frames, and clamp means for securing said bar to the supporting arms of said bumper for maintaining said frames and said spaced apart material vertically between said bumper and said fenders for protecting the fenders.

GORDON E. BLENDERMAN.